July 12, 1938.  W. J. FIEGEL  2,123,626
METHOD OF JOINING METAL STRIPS
Filed Aug. 31, 1935  3 Sheets-Sheet 2

INVENTOR
WILLIAM J. FIEGEL
BY
ATTORNEYS

July 12, 1938.   W. J. FIEGEL   2,123,626
METHOD OF JOINING METAL STRIPS
Filed Aug. 31, 1935   3 Sheets-Sheet 3
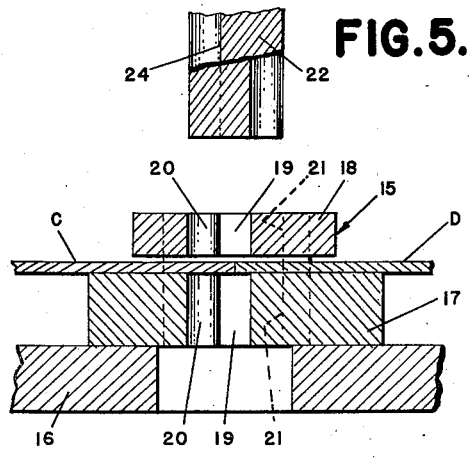
FIG.5.
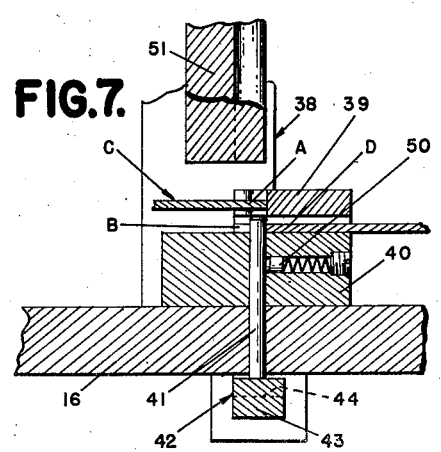
FIG.7.
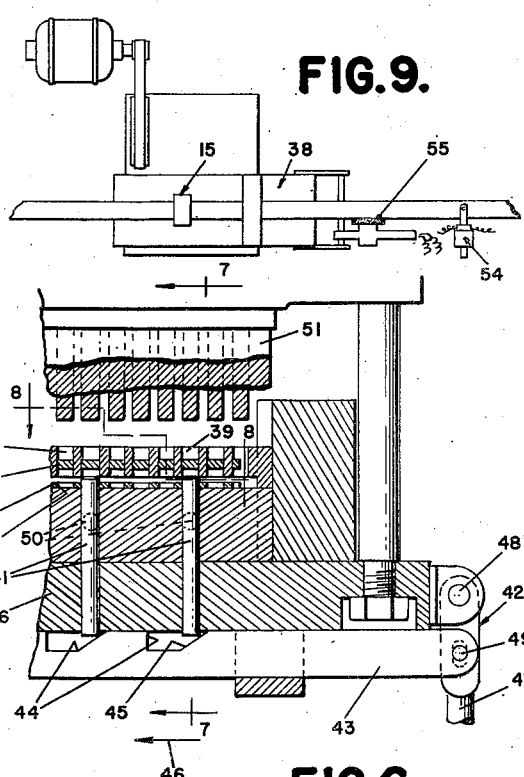
FIG.9.
FIG.6.
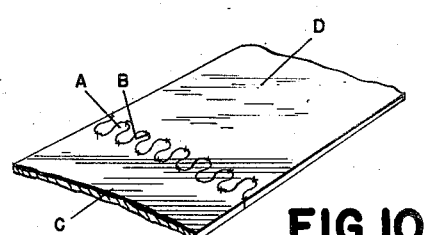
FIG.10.
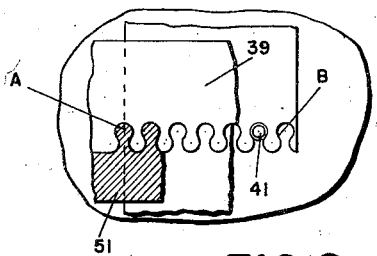
FIG.8.
INVENTOR
WILLIAM J. FIEGEL
BY
Whittemore Hulbert Whittemore Belknap
ATTORNEYS Patented July 12, 1938

2,123,626

UNITED STATES PATENT OFFICE 2,123,626

METHOD OF JOINING METAL STRIPS

William J. Fiegel, Detroit, Mich., assignor to Bohn Aluminum & Brass Corporation, Detroit, Mich., a corporation of Michigan Application August 31, 1935, Serial No. 38,828

2 Claims. (Cl. 113—116)

This invention relates to an improved method for joining the free ends of metallic strips.

One of the principal objects of the present invention resides in the provision of a method of joining the free ends of a pair of metallic strips comprising a few simple operations capable of being expediently effected by a relatively simple and inexpensive apparatus.

Another object of this invention consists in joining the free ends of a pair of strips in such a manner as to effect a permanent connection therebetween and also in such a manner that the opposite surfaces of the strips are flush, or, in other words, lie in common planes.

Other advantageous features of my improved apparatus and the novel method employed for effecting the joint will become more apparent as this description proceeds, especially when considered in connection with the accompanying drawings, wherein:

Figure 5 is a detailed sectional view illustrating the punching mechanism;

Figure 6 is a fragmentary sectional view illustrating the means provided herein for relatively positioning the strips prior to the joining operation;

Figure 7 is a sectional view taken substantially on the plane indicated by the line 7—7 of Figure 6;

Figure 8 is a sectional view taken substantially on the plane indicated by the line 8—8 of Figure 6;

Figure 9 is a fragmentary diagrammatic view illustrating the means for finishing the opposite edges of the joint and for welding the joint;

Figure 10 is a fragmentary perspective view of the two strips after the latter have been permanently joined.

In accordance with the present invention, the extremity of one of the strips to be joined is fashioned to provide tongues A having enlarged end portions, and the extremity of the other strip to be joined with the strip aforesaid is fashioned to form correspondingly shaped recesses B therethrough. After the strips have been fashioned in the above manner, the extremities thereof are positioned in superposed overlapping relation, in the manner shown in Figure 7, to register the tongues A on the strip C with the recesses B in the strip D. The extremities of the strips are then relatively moved in directions toward each other to force the tongues A into the recesses B to provide a continuous strip having the top and bottom surfaces on opposite sides of the joint lying in common planes. Upon completion of the above operation, the tongues A are preferably welded or otherwise permanently secured to the side walls of the recesses B, and the opposite side edges of the strip thus formed, may be finished at the joint by subjecting the same to a grinding operation.

Figure 1:
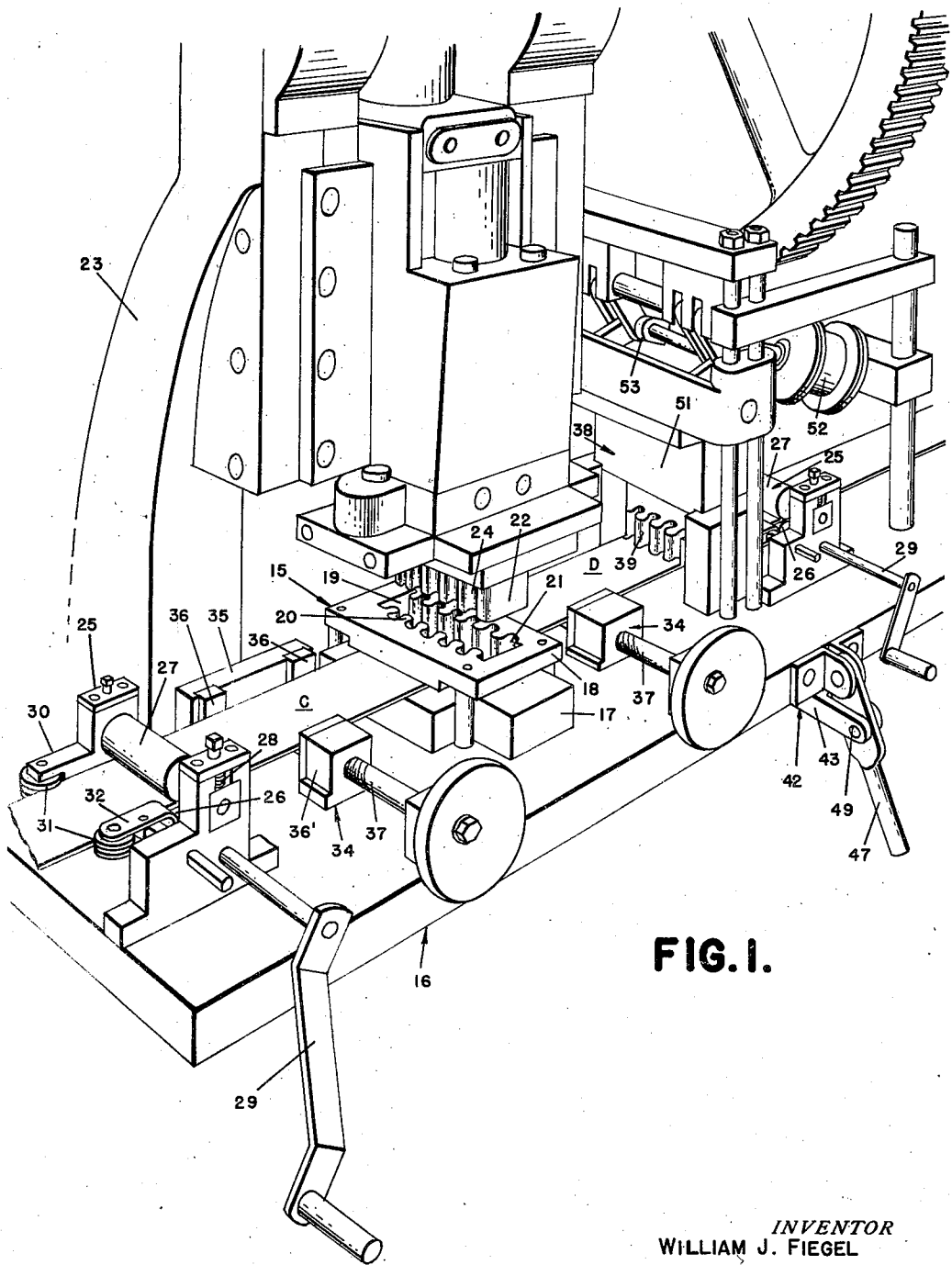
Figure 1 is a fragmentary perspective view of my improved joining apparatus.
Figure 2:
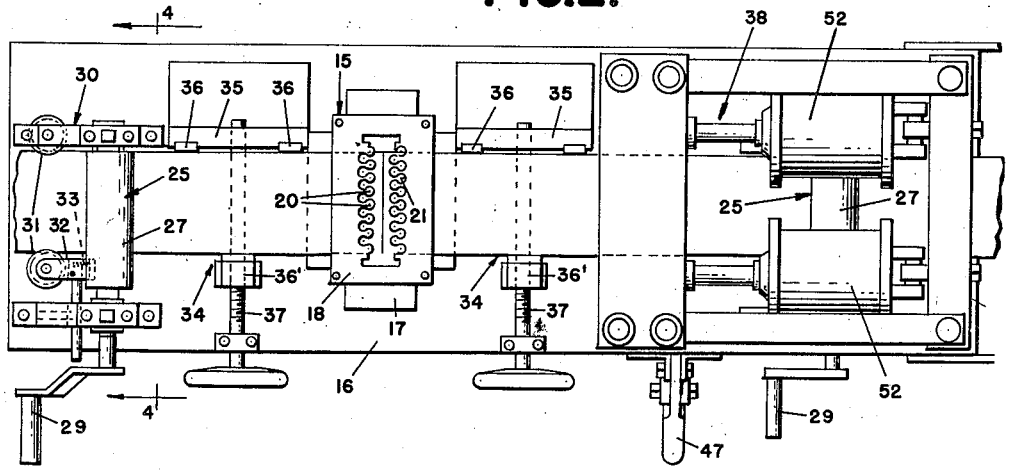
Figure 2 is a plan view of a portion of the apparatus shown in Figure 1.
Figure 3:
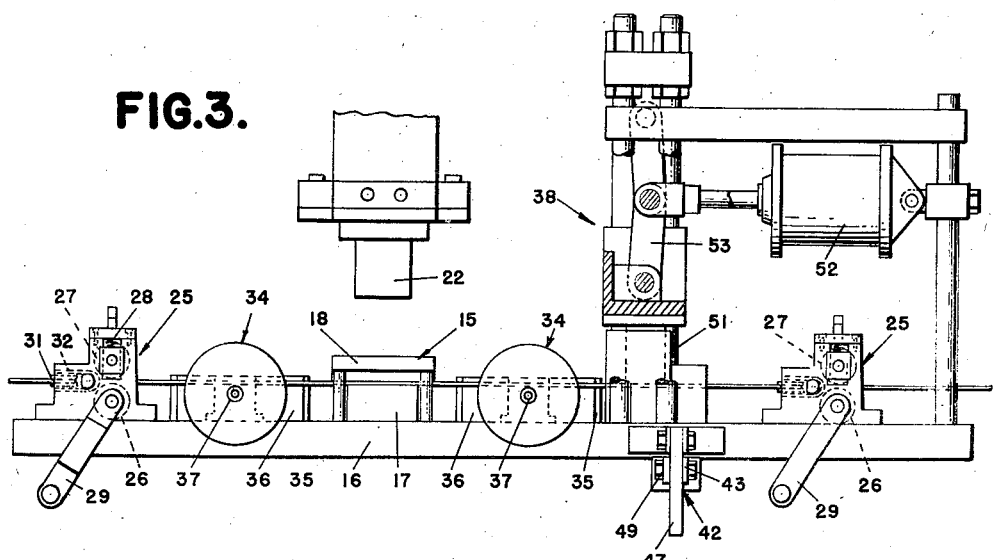
Figure 3 is a side elevational view partly in section of the apparatus shown in Figure 1.
Figure 4:
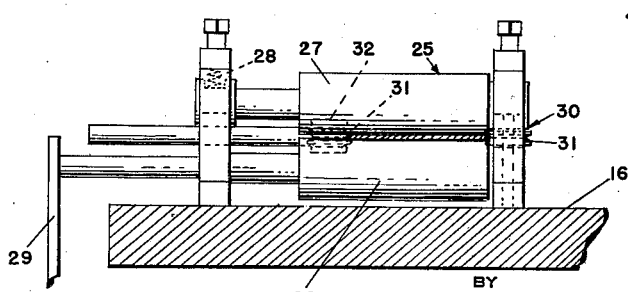
Figure 4 is a cross sectional view taken substantially on the plane indicated by the line 4—4 of Figure 2.

Referring now to the apparatus for carrying out the several steps of the method briefly outlined above, it will be noted that there is illustrated in Figure 1 a die assembly 15 secured upon a table 16 intermediate the ends thereof. In detail, the die assembly comprises a bottom section 17 and a top section 18 secured to the table in vertical spaced relation to the bottom section. As will be observed from Figure 5, the space between the two die sections is predetermined to provide for the passage of the strips to be joined therebetween. Both of the die sections are provided with openings 19 therethrough, and as will be observed from Figure 1, the openings are elongated in a direction at right angles to the path of travel of the strips to be joined between the die sections. One longitudinal side of the opening 19 through the lower die section 17 and the corresponding side of the opening through the complementary upper die section 18 are fashioned to form the projections 20 corresponding in shape to the tongues or fingers A. In other words, the registering projections 20 on the complementary die sections extend in the direction of length of the strips to be joined and are provided with enlarged extremities or free end portions. The opposite sides of the openings 19 through the complementary die sections are fashioned to form recesses 21 corresponding exactly in shape to the recesses B for receiving the tongues A and located directly opposite the projections 20.

Cooperating with the die sections is a punch 22 mounted upon the frame structure 23 of the apparatus for reciprocation toward and away from the die sections. As will be observed from Figure 1, the punch 22 is so located with respect to the die sections as to permit movement of the punch into the registering openings 19 in the die sections, and the sides of the punch adjacent the contoured sides of the openings through the die sections are fashioned to fit the contoured portions of the latter sides upon movement of the punch into the die sections. In detail, the side of the punch 22 adjacent the sides of the registering openings 19 equipped with the projections 20 is fashioned to correspond to the contour of the opposite sides of the registering openings 19, or, in other words, is formed with recesses 24 corresponding in shape to the recesses 21 in order to receive the projections 20 upon movement of the punch toward the die sections. On the other hand, the opposite side of the punch is fashioned with projections corresponding to the projections 20 and adapted to be received in the recesses 21 when the punch is moved toward the die sections.

With the foregoing construction, it will be observed that the adjacent ends of a pair of strips to be joined may be simultaneously punched to form the projections A on the end of one of the strips and to form opposed recesses B in the end of the other strip corresponding in shape to the contour of the projections for receiving the latter, in the manner shown in Figure 10. In accordance with this invention, the two strips to be joined are positioned between the die sections with the adjacent edges thereof in abutting relationship midway between the contoured sides of the registering openings 19 in the die sections by manually operable friction rolls 25 arranged in pairs on opposite sides of the die sections. As shown in Figure 1, both pairs of friction rolls are identical in construction, and each pair comprises a bottom roll 26 and a top roll 27 yieldably urged toward the bottom roll by suitable springs 28. It will, of course, be understood that the strips to be joined pass between the cooperating rolls and, in the present instance, the lower roll of each pair is manually revolved by a suitable crank 29. In order to insure movement of the strips in a rectilinear path by the friction rolls suitable guides 30 are engaged with opposite edges of the strips in advance of the friction rolls. In the specific embodiment of the invention, the guides are in the form of a pair of rollers 31 journaled upon opposite sides of the path of travel of the strip and peripherally grooved to receive the opposite edges of the strips. To compensate for variations in widths of the strips one of the rollers 31 is journaled upon a bracket 32 pivotally supported for swinging movement in a plane parallel to the plane of the strip and normally urged in a direction to engage the roller carried thereby with the strip by a suitable spring 33.

It is desired to positively hold the strips in fixed relationship to the die sections during the punching operation and for accomplishing this result I provide a pair of clamps 34 disposed upon opposite sides of the die sections immediately adjacent the latter. Each of the clamps is provided with a wear plate 35 disposed at one side of the path of travel of the strips and having portions 36 engageable with the edges of the strip adjacent the wear plate. During the punching operation, the strips are clamped to the wear plates by means of nuts 36¹ slidably supported on the table for engagement with the opposite edges of the strips and actuated by the screws 37.

After the adjacent edges of the strips to be joined are properly punched, the strips are introduced to suitable joining mechanism designated generally in the several figures by the reference character 38. The joining mechanism 38 comprises a die 39 extending transversely of the path of travel of the strips and secured to the table 16 upon one side of the punch 22. The side of the die 39 facing the punch is fashioned to correspond in shape to the contour of the end of the strip D and cooperates with a block 40 to provide a space therebetween of sufficient dimension to permit the strip D to pass therethrough. It will be noted that the height of the block 40 is the same as the height of the die section 17 so as to permit advancement of the strips through the apparatus in a common plane.

With the above construction, it will be noted that after the punching operation, the crank 29 for operating the friction rolls associated with the strip D is actuated to advance the strip D to a position wherein the contoured end thereof registers with the complementary contoured side of the die 39 in the manner shown in Figure 7.

In order to insure holding the strip D in the aforesaid position thereof, I provide a pair of locating pins 41 mounted for vertical sliding movement in the table and block 40. Normally, the upper ends of the pins 41 lie flush with the top surface of the block 40, while the lower ends thereof project below the table for engagement with the actuating means 42 shown in Figure 6. The actuating means 42 comprises a bar 43 mounted upon the underside of the table 16 for reciprocation in directions transverse to the path of travel of the strips to be joined and is formed with a pair of slots 44 in the top surface thereof for receiving the lower ends of the pins 41. The front walls 45 of the slots are inclined in the manner shown in Figure 6 for engagement with the lower ends of the pins 41 upon movement of the bar 43 in the direction of the arrow 46 to move the upper ends of the pins beyond the top surface of the block 40. In the present instance, the bar 43 is actuated by a suitable lever 47 pivotally mounted as at 48 upon the front side of the table and having a slot and pin connection 49 with the bar 43. The construction is such that when the lever 47 is swung downwardly the bar 43 is moved in a direction to extend the upper ends of the pins above the block 40, and movement of the lever upwardly returns the bar 43, or, in other words, disengages the inclined surfaces 45 from the pins. Upon reference to Figure 7, it will be noted that provision is made in the form of spring pressed detents 50 for frictionally holding the pins 41 in their uppermost positions after the bar 43 has been returned to its inoperative position by the lever 47.

It will be understood from Figure 8 that the pins are adapted to engage in the portions of the recesses B corresponding to the enlarged ends of the tongues A and the diameter of the pins is such as to cooperate with the reduced portions of the recesses B to prevent movement of the strip D. After the strip D is properly located in the manner shown in Figure 7, the strip C is advanced and the tongues or projections A on the end thereof are inserted into the corresponding recesses formed in the die 39. The strip C is then moved in a direction toward the strip D to provide for inserting the tongues A into the recesses B. This latter operation is accomplished by a plunger 51 mounted for reciprocation toward and away from the die 39. The side of the plunger adjacent the contoured side of the die 39 is fashioned to correspond exactly to the contoured end of the strip C, and, as a consequence, the tongues on the plunger are engaged in the corresponding recesses in the die 39 upon downward movement of the plunger. In the present instance, the plunger 51 is reciprocated by suitable pneumatic devices 52 through the medium of toggle linkage 53.

*Operation*

Referring now to the operation of the apparatus previously described, it will be noted that the two strips to be joined are advanced by the friction driving means 25 in directions toward each other to position the adjacent edges thereof in abutting relationship substantially midway between the opposite sides of the registering openings 19 in the die 15. After the two strips have been properly positioned with respect to each other and the die 15, the clamps 37 are actuated to prevent accidental movement of the strips. The punch 22 is then lowered to fashion the adjacent ends of the strips to the contour shown in Figure 10. As the punch 22 is withdrawn from the die 15, the clamps 37 are released and the strip D is advanced to the joining device 38 whereupon the lever 47 is swung downwardly to engage the upper ends of the locating pins 41 in a pair of the recesses B previously formed in the end of the strip D by the punch. The strip C is then advanced and the contoured end thereof is engaged with the die 39 in the manner shown in Figure 7. In this position of the strip C the contoured end is disposed in overlapping relation with the contoured end of the strip D and the joining operation is effected by lowering the plunger 51 to urge the contoured end of the strip C into interfitting relationship with the contoured end of the strip D. It will, of course, be apparent that the lever 47 for actuating the locating pins is returned to its inoperative position prior to lowering the plunger 51 so as to permit unrestricted downward movement of the pins against the action of the spring detents 50 by the plunger Upon completion of the joining operation, the strip C lies in a common plane with the strip D and is permanently secured to the latter. However, in order to insure a permanent connection between the two strips, the ends of the latter are welded by suitable welding apparatus designated generally in Figure 9 by the reference character 54. If desired, the welding apparatus may be mounted upon the table beyond the joining device and the strip may be advanced to a position in registration with the welding apparatus by manipulating the friction driving means 25. It may also be desired to remove any burrs that may result from joining the adjacent ends of the strips, and this is accomplished in the present instance by suitable grinding wheels 55 disposed upon opposite sides of the path of travel of the strip for engagement with the side edges of the latter as the same is advanced from the joining device to the welding apparatus.

Thus from the foregoing, it will be observed that I have provided a method of permanently joining adjacent ends of metallic strips, composed of relatively few simple steps capable of being expediently performed.

What I claim as my invention is:

1. Those steps in the method of preparing elongated strips to be joined which consist in supporting the strips with the longitudinal axis of one strip forming a continuation of the longitudinal axis of another strip and with the adjacent ends of the strips in juxtaposition to each other and lying in substantially the same plane; and, while the strips are so supported, simultaneously forming the juxtapositioned ends of the strips to provide projections on one end and corresponding recesses in the other end opposite the projections.

2. Those steps in the method of joining elongated strips which consist in supporting the strips with the longitudinal axis of one strip forming a continuation of the longitudinal axis of another strip and with the adjacent ends of the strips in juxtaposition to each other and lying in substantially the same plane; and while the strips are so supported, simultaneously forming the juxtapositioned ends of the strips to provide projections on one end and corresponding recesses in the other end opposite the projections; and engaging the projections in said recesses without substantially disturbing the alignment of the longitudinal axes of the strips.

WILLIAM J. FIEGEL.